UNITED STATES PATENT OFFICE.

WILLIAM C. BIBB, OF MADISON, GEORGIA.

IMPROVEMENT IN INSECT-DESTROYING COMPOUNDS.

Specification forming part of Letters Patent No. 142,985, dated September 23, 1873; application filed August 16, 1873.

*To all whom it may concern:*

Be it known that I, WILLIAM C. BIBB, of Madison, Georgia, have invented an Insect-Destroying Compound, of which the following is a specification:

The nature of my invention consists in compounding arsenic acid, sulphate of copper, and rosin, in equal or nearly equal proportions, by pounding or grinding the same together or separately, and mixing them intimately by revolving sieve or vessel, so that that object is accomplished, or by dissolving the two former in soap-suds of what is known as turpentine soap, or in extract of pine, and scattering upon the plant, or sprinkling the fluid in any convenient mode upon the cotton or other plant, until it has become covered with the dust or wetted fully with the fluid.

I claim—

The above compound as my invention, substantially as described, and for the purpose hereinbefore set forth.

WILLIAM C. BIBB.

Witnesses:
   GEORGE F. AKERS,
   WILLIAM J. ANDERSON.